Sept. 17, 1940.  A. VOORHIES, JR  2,215,305
PROCESS FOR REACTIVATING SYNTHETIC OXIDE GEL CATALYSTS
Filed Dec. 10, 1938
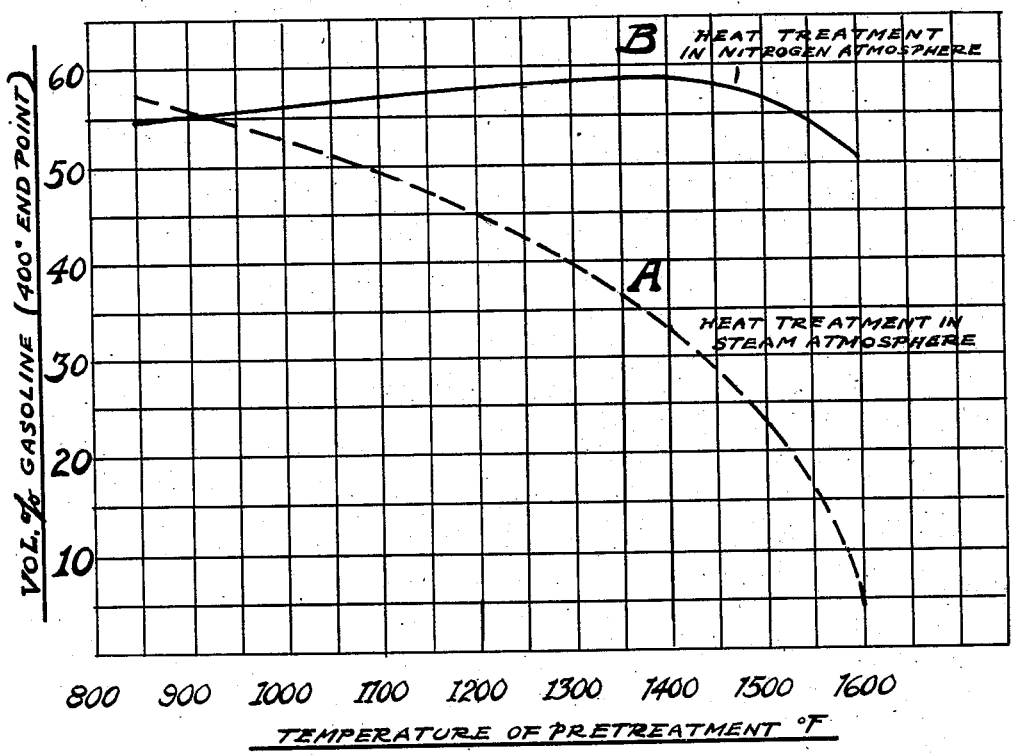
Fig.—1

Patented Sept. 17, 1940

2,215,305

UNITED STATES PATENT OFFICE 2,215,305

PROCESS FOR REACTIVATING SYNTHETIC OXIDE GEL CATALYSTS

Alexis Voorhies, Jr., Baton Rouge, La., assignor to Standard Oil Development Company, a corporation of Delaware Application December 10, 1938, Serial No. 244,891

1 Claim. (Cl. 23—238)

This invention relates to the regeneration of synthetic inorganic gel-type catalysts after they have become inactivated by the carbonaceous deposit usually formed on such catalysts during use. More specifically, it deals with a method for regenerating spent synthetic gel-type catalysts so as to enable them to be regenerated at temperatures heretofore considered inapplicable for this purpose.

Certain inorganic compounds such as silica and alumina have the property of existing in the hydrogel form, which, upon drying, yields a very porous mass, (dried gel) of high catalytic activity. These hydrogels are generally prepared by allowing a hydrosol to "set" until a considerable portion of the reaction liquid is imbibed by some sort of colloidal structural arrangement. Two different hydrogels may be intimately mixed to obtain a mechanical mixture, which upon drying, may have superior properties over either one of the individual constituents. Plural hydrogels are obtained by allowing a mixed hydrosol of different metal compounds to "set." Impregnated gels may be prepared by soaking washed hydrogels in different salt solutions so that the latter are completely dispersed throughout the mass. Gelatinous precipitates differ from hydrogels by the fact that they separate from the liquor as a slimy fluid jelly in a separate phase leaving some supernatant liquid above. A heterogeneous gel, on the other hand, is a gelatinous precipitate dispersed in a hydrosol and allowed to "set" or "gel."

For the purposes of this invention, the term "hydrous oxide jelly" will be employed to designate all gels other than those in the dried form which no longer possess the flexible characteristics attributable to gels containing appreciable amounts of imbibed water.

For example, a hydrosol of silica may be prepared by mixing equal volumes of 25° Bé. sodium silicate solution and 23° Bé. sulfuric acid solution. In 3–5 hours, the hydrosol sets to a silica hydrogel, imbibing all of the reaction liquids. The hydrogel may be broken up, washed free of reaction salts, formed and dried. Alumina hydrogel may be prepared by mixing with stirring, a solution of 10 kg. of $Al_2(SO_4)_3.15H_2O$ dissolved in 100 liters of water with 100 liters of $1N.NH_4OH$, allowing the hydrosol to stand until it sets to a hydrogel, and washing by decantation with distilled water. A mechanical mixture of the two hydrogels is obtained by intimate mixing of the two washed hydrogels.

Plural hydrogels of silica and alumina may be prepared by adding 23° Bé. sulfuric acid solution containing aluminum sulfate to a volume of 25° Bé. sodium silicate solution. After the hydrogel has set, it is washed with distilled water.

Impregnated gels having molal ratios of about $12SiO_2:1Al_2O_3$ are prepared by soaking washed silica hydrogel overnight in a 30% solution of $Al(NO_3)_3.9H_2O$, draining, drying, and decomposing the aluminum nitrate by heat. These dried products of hydrogels which no longer retain their spongy characteristics are known as dried gels.

The present invention deals with dried gel catalysts, especially those employed for catalyzing the cracking of heavier hydrocarbons at temperatures in the range of 700–1100° F., although the method is applicable to such catalysts employed for polymerization, alkylation, isomerization, and the like at even lower temperatures (400–800° F.). The method is particularly suited for synthetic gel cracking catalysts comprising silica-alumina, with or without various modifying elements, such as Mg, U, Th, Zr, Be, Ce, B, Mn, W, Sn, Fe, Tl, Cd, V, Mo, Cr, etc.

When a dried gel-type catalyst is employed for the cracking of a gas oil at 950° F., for example, it gradually acquires a deposit of carbon on the surface until finally, the amount of gasoline produced is very low. Natural or activated clays have been regenerated to substantially their original activity by oxidizing with air in presence of steam. When this is carried out with the synthetic gels of the present invention, a sharp drop in activity is observed during consecutive cracking cycles, especially when regeneration is carried out at high temperatures (1200–1600° F.), so that, after a relatively short while, it is necessary to discard the catalyst because of the impossibility of reactivation to a commercially attractive activity.

It has been found that this permanent deactivation of the synthetic gel catalysts is attributable to the presence of steam during the regeneration operation. Although as much as 5–10% steam may be permissible with such catalysts during the cracking cycle (which is generally carried out at a temperature below the regeneration temperature) without any appreciable deleterious effect, even as much as 5% or even 1% moisture present in the regeneration gas at the regeneration temperature is sufficient to cause rapid decay of the catalytic surface. According to this invention, therefore, the regeneration of these synthetic gel-type catalysts is carried out in the substantial absence of steam, and preferably in an inert gas such as nitrogen or carbon dioxide containing 2-10% or more of oxygen. Furthermore, if the regeneration is carried out in this manner, it is possible to regenerate at temperatures as high as 1400° F. or even 1600° F. without substantial loss in catalytic activity, such temperatures being considered prohibitive in the case of activated clays or gels in the presence of steam.

These observations can be more readily understood by reference to the accompanying drawing designated as Figure 1. A synthetic silica-alumina gel catalyst was prepared and subjected to heat treatment in presence of the regenerating gases with or without steam present at various temperatures. This heat treatment is a more rapid method for determining the regeneration characteristics of the catalyst than the usual cracking-regeneration cycle procedure normally employed. The activity after this treatment (as extrapolated to the initial cycle) is shown by curve A. It is to be observed that although the original activity of the catalyst was fairly high at 800° F., it dropped rapidly with increase in temperature during treatment until at 1600°, its activity was less than $\frac{1}{10}$ that of the original value.

Another sample of the same catalyst subjected to the same treating conditions was subjected to various temperatures in the substantial absence of steam, i. e., in a dry atmosphere of nitrogen and oxygen. The results obtained are plotted as curve B. It will be noted that although the activity of this catalyst was almost the same as that shown by curve A at 800° F., it maintained a constant, if not a somewhat increasing activity even at 1400°. At 1600° F. its activity was still quite close to the activity at 800° F. and considerably higher than the activity of the steam-air treated catalyst at 1600° F.

The following examples illustrate some of the many phases involved in the present invention:

*Example 1.*—A West Texas gas oil was cracked over a synthetic plural gel catalyst prepared by forming a hydrogel from a mixed hydrosol containing silica and alumina in a weight ratio of about 1.7:1, washing, and drying. The velocity of the feed over the catalyst was 1.2 vol. of oil/vol. of catalyst/hr. and the temperature of cracking was 850° F. The cracking was carried out for 1 hr. when a gasoline yield of 39% was realized, after which the catalyst was regenerated at 995-1125° F., using a mixture of air and steam. The cycle was repeated, and at the end of the 50th cycle, the gasoline yield was 28%.

*Example 2.*—The cracking operation was carried out under the same conditions and with the same feed stock and catalyst as in Example 1. The regeneration, however, was carried out at 1100-1200° F. with the same concentration of oxygen in nitrogen in substantial absence of any steam. At the end of the 50th cycle, the gasoline yield was 39%, equal to the initial yield obtained with the fresh catalyst.

These results show that whereas a 28% loss in yield was suffered by the usual steam-air regeneration, no loss in yield was incurred when steam was avoided during the regeneration step.

The regeneration may also be carried out under pressure, say 5-20 atmospheres, and under such conditions it is desirable to maintain a fairly low oxygen concentration (2-10%).

The present application is a continuation-in-part of my co-pending application Serial No. 200,151 filed on April 5, 1938.

Various other variations and modifications may be employed and this invention is not limited to any examples or mechanisms of operation but only by the following claim in which it is intended to cover the invention as broadly as the prior art permits.

I claim:

A method of regenerating synthetic oxide gel catalysts containing carbonaceous deposits resulting from the high temperature treatment of hydrocarbon oils which comprises passing an oxidizing gas substantially free of water vapor and have an oxygen concentration materially below that of air in contact with said catalyst in a regenerating zone, keeping said gas in contact with said catalyst for a period sufficient to burn the carbonaceous deposits therefrom and maintaining said regenerating zone at a temperature of from 1200° to 1600° F. during at least a portion of the regeneration period.

ALEXIS VOORHIES, Jr.